(12) United States Patent  (10) Patent No.: US 7,954,130 B2
Yanai  (45) Date of Patent: May 31, 2011

(54) NETWORK CAMERA SYSTEM AND NETWORK CAMERA CONTROL PROGRAM

(75) Inventor: Shin Yanai, Tokyo (JP)

(73) Assignee: Sony Corporation, Tokyo (JP)

( * ) Notice: Subject to any disclaimer, the term of this patent is extended or adjusted under 35 U.S.C. 154(b) by 796 days.

(21) Appl. No.: 11/565,134

(22) Filed: Nov. 30, 2006

(65) Prior Publication Data

US 2007/0130600 A1  Jun. 7, 2007

(30) Foreign Application Priority Data

Dec. 2, 2005 (JP) ................................. 2005-348640

(51) Int. Cl.
H04N 7/173 (2006.01)
(52) U.S. Cl. ..................................... 725/105; 348/211.3
(58) Field of Classification Search .......................... None
See application file for complete search history.

(56) References Cited

U.S. PATENT DOCUMENTS

| 6,404,776 | B1 * | 6/2002 | Voois et al. ..................... 370/468 |
| 6,469,737 | B1 * | 10/2002 | Igarashi et al. ............. 348/211.3 |
| 6,970,183 | B1 * | 11/2005 | Monroe ......................... 348/143 |
| 2002/0067254 | A1 * | 6/2002 | Ebata et al. .................... 340/506 |
| 2003/0177500 | A1 * | 9/2003 | Nakamura et al. ............. 725/105 |
| 2005/0044258 | A1 * | 2/2005 | Nakamura ..................... 709/232 |
| 2005/0120128 | A1 * | 6/2005 | Willes et al. .................. 709/232 |
| 2005/0200714 | A1 * | 9/2005 | Marchese .................. 348/211.3 |
| 2006/0053459 | A1 * | 3/2006 | Simerly et al. ................ 725/105 |
| 2006/0209857 | A1 * | 9/2006 | Hicks et al. ................... 370/401 |
| 2006/0271658 | A1 * | 11/2006 | Beliles et al. ................. 709/223 |

FOREIGN PATENT DOCUMENTS

| JP | 10-42185 | 2/1998 |
| JP | 2000-184367 | 6/2000 |
| JP | 2003-264790 | 9/2003 |
| JP | 2004-282162 | 10/2004 |
| JP | 2004336105 A * | 11/2004 |

OTHER PUBLICATIONS

Wu et al., "Streaming Video Over the Internet: Approaches and Directions", IEEE Transactions on Circuits and Systems for Video Technology, vol. 11, No. 3, Mar. 2001.*

* cited by examiner

Primary Examiner — Lin Ye
Assistant Examiner — Dennis Hogue
(74) Attorney, Agent, or Firm — Oblon, Spivak, McClelland, Maier & Neustadt, L.L.P.

(57) ABSTRACT

A network camera system that transmits video captured by a camera to a client via a network include a recording device directly connected thereto or built therein, wherein the client switches between a normal mode in which the camera transmits continuous video images and a file transfer mode in which video captured by the camera is temporarily stored as a file in the recording device and the file is transferred to the client in response to an instruction from the client.

17 Claims, 5 Drawing Sheets

NETWORK CAMERA SYSTEM AND NETWORK CAMERA CONTROL PROGRAM

CROSS REFERENCES TO RELATED APPLICATIONS

The present invention contains subject matter related to Japanese Patent Application JP 2005-348640 filed in the Japanese Patent Office on Dec. 2, 2005, the entire contents of which being incorporated herein by reference.

BACKGROUND OF THE INVENTION

1. Field of the Invention

The invention relates to a network camera system that transmits video captured by a camera to a client via a network and a network camera control program executed on the client to control the operation of the camera.

2. Description of the Related Art

In recent years, network camera systems are widely used in such a way that video and audio from a surveillance camera on a network is streamed via a network and recorded at the destination of the streamed video and audio in accordance with various formats.

For example, JP-A-2004-146959 and JP-A-2005-136613 describe network camera systems in which images captured by a camera can be delivered via a network and viewed in a Web (World Wide Web) browser on a client computer.

JP-A-2004-146959 discloses a technology in which a still image captured by a surveillance camera and a surveillance information file containing alarm information on motions detected in a surveillance area are transmitted to a Web server and the still image and the surveillance information file are transferred in a realtime manner while an access terminal keeps sending a connection request.

JP-A-2005-136613 discloses a technology in which priorities are set to a plurality of image delivery sections in a network surveillance system and the plurality of image delivery sections deliver surveillance video based on the network traffic condition and the priorities.

SUMMARY OF THE INVENTION

However, in the related art, the network condition may affect the process of streaming each frame of JPEG (Joint Photographic Experts Group) still images and MPEG4 (Moving Picture Experts Group phase 4) video images. For example, when the available bandwidth is narrow, quite a few video and audio frames are dropped out, disadvantageously resulting in reduced image and audio quality.

According to an embodiment of the invention, there is provided a network camera system that transmits video captured by a camera to a client via a network. The camera is provided with a recording device directly connected thereto or built therein. The client can switch between a normal mode in which the camera transmits continuous video images and a file transfer mode in which video captured by the camera is temporarily stored as a file in the recording device and the file is transferred to the client in response to an instruction from the client.

In the embodiment of the invention, since switching is performed in response to the instruction from the client between the normal mode in which video images are continuously transmitted and the file transfer mode in which the video file temporarily stored in the recording device is transferred, the client can acquire continuous video images in the normal mode when the network load is low, while the client can acquire dropout-free image data by transferring the pre-stored file when the network load is high.

When a moving object or a predetermined object is detected from the video captured by the camera, the image data is desirably transferred to the client in the file transfer mode because dropout-free, high-quality images may be required. Alternatively, by switching between the normal mode and the file transfer mode according to a preset schedule, high-quality image data can be automatically acquired at the timing that the user of the client desires.

According to another embodiment of the invention, there is provided a network camera control program executed on a client computer to allow the client to receive video captured by a camera via a network. The network camera control program switches between a normal mode in which the client continuously receives continuous video images captured by the camera via the network and a file transfer mode in which continuous video images captured by the camera are temporarily stored as files in a recording device directly connected to the camera or built in the camera and then the client receives the files via the network.

In the embodiment of the invention, since the network camera control program executed on the client switches the normal mode in which video images are continuously transmitted and the file transfer mode in which the video files temporarily stored in the recording device are transferred, the client can acquire continuous video images in the normal mode when the network load is low, while the client can acquire dropout-free image data by transferring the pre-stored files when the network load is high.

Therefore, according to the embodiments of the invention, a client can acquire video and audio from a surveillance camera via a network without increasing the network load beyond the range the user desires. Video and audio can also be recorded in a recording device provided in the surveillance camera and delivered to the client by means of file transfer, thereby preventing reduced quality of video and audio due to the network load.

DESCRIPTION OF THE PREFERRED EMBODIMENTS

Figure 1:
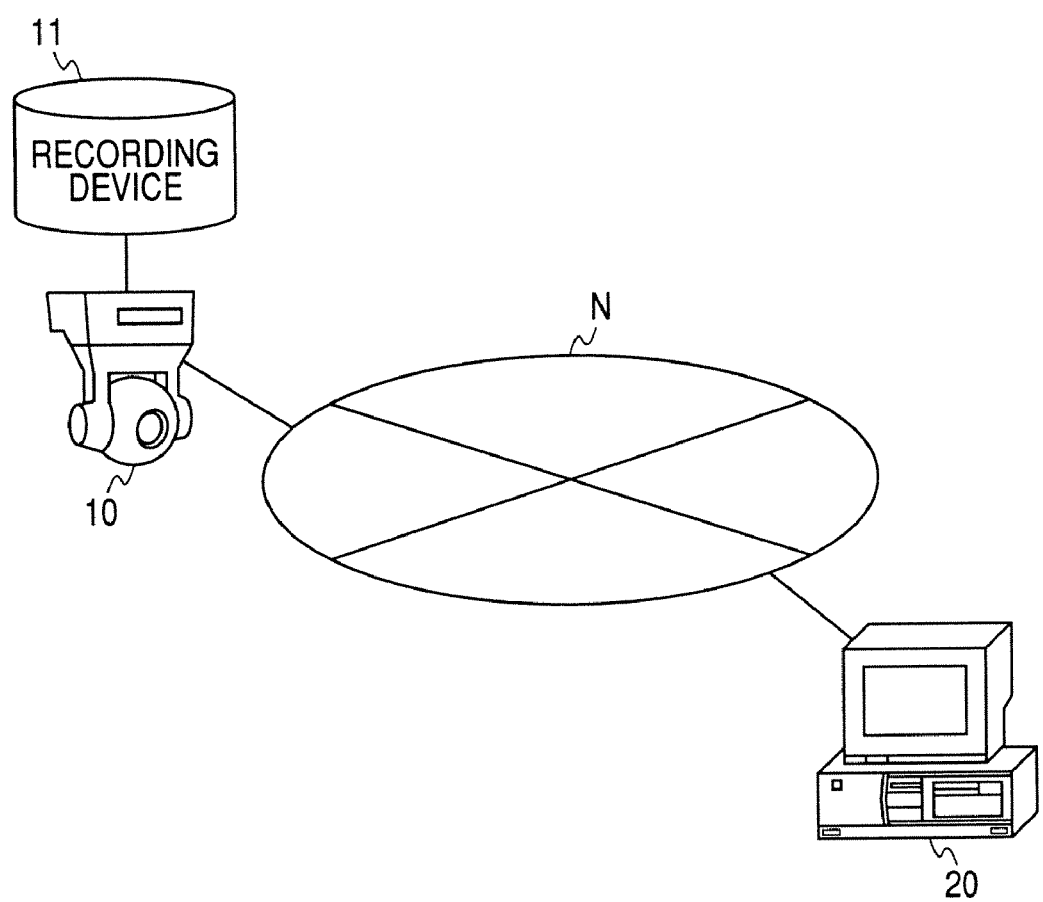
FIG. 1 is a schematic configuration diagram of the network camera system according to the embodiment.

Embodiments of the invention will be described below with reference to the drawings. FIG. 1 is a schematic configuration diagram of the network camera system according to this embodiment. That is, the network camera system according to this embodiment includes a surveillance camera 10 capable of capturing video and audio, a recording device 11 directly connected to or built in the surveillance camera 10 and a client 20 (computer) that acquires the video and audio captured by the surveillance camera 10 via a network N.

Such a network camera system according to this embodiment is characterized in that switching can be performed between a mode (normal mode) in which video and audio captured by the surveillance camera 10 is continuously delivered and a mode (file transfer mode) in which video and audio captured by the surveillance camera 10 is temporarily stored as files in the recording device 11 and the files are transferred on a file basis in response to an instruction from the client 20.

In the normal mode, streamed video can be acquired by continuously delivering video and the like captured by the surveillance camera 10 to the network N and displaying them, for example, in a Web (World Wide Web) browser of the client 20.

On the other hand, in the file transfer mode, video and the like captured by the surveillance camera 10 is temporarily stored in the recording device 11 and the recording device 11 and the client 20, for example, function as an FTP (File Transfer Protocol) server and an FTP client, respectively, for FTP file transfer. In this mode, since files can be stored in the recording device 11 independent of the network N, dropout-free image data can be stored as files and the image data can be sent to the client 20 on a file basis using FTP file transfer. Therefore, the client 20 can reproduce the transferred files as image data to display dropout-free, high quality video.

In such a network camera system, a program executed on the computer, i.e., the client 20, can switch between the modes described above. Such a mode switching control program includes software capable of measuring the usage band of the network N, software for controlling data communication with the surveillance camera 10 by means of scheduling and software capable of operating as an FTP client. The operation of a specific program will be described below.

Figure 2:
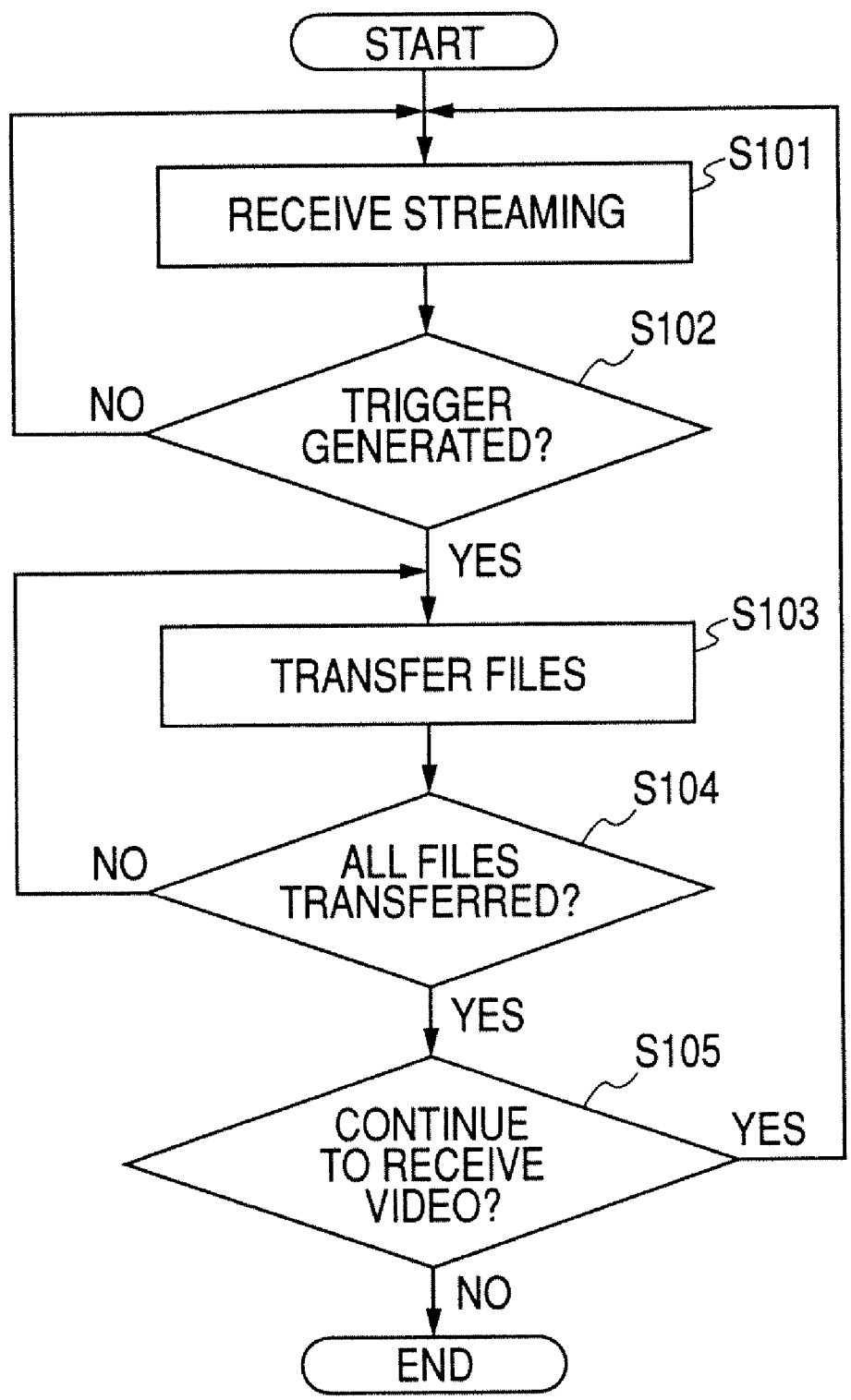
FIG. 2 is a flowchart for explaining the main flow of the network camera control program according to the embodiment.

FIG. 2 is a flowchart for explaining the main flow of the network camera control program according to this embodiment. This program executed on the computer, i.e., the client, switches between the modes described above. Firstly, video captured by the surveillance camera are continuously received (streamed) in the normal mode (step S101). When the network is less loaded, the client can receive video streamed and delivered and display them, for example, in a Web browser.

During this state, when a predetermined trigger is generated (step S102) and the client sends a switching instruction to the surveillance camera, the camera is switched to operate in the FTP file transfer mode. For example, the surveillance camera not only streams video but also stores video for the last certain period of time, or store video for a certain period of time when the surveillance camera is switched to operate in the file transfer mode, so as to store the video as files. Subsequently, when the client instructs the surveillance camera to switch to operate in the file transfer mode, the stored files are transferred to the client on a file basis by means of FTP (step S103).

Then, it is determined whether or not all files requested by the client have been transferred (step S104). When part of the files have not been transferred, the FTP file transfer continues, while when all requested files have been transferred, it is determined whether or not to continue video reception (step S105). If YES, the surveillance camera is switched to operate in the normal mode to resume video reception by means of streaming.

The operation of the surveillance camera may be switched from the normal mode to the file transfer mode (1) when a moving object is detected from video captured by the camera, (2) when a predetermined object is detected from video captured by the camera, or (3) according to a preset schedule.

When a moving object is detected or when a predetermined object is detected from the video captured by the camera, the image data is desirably transferred to the client in the file transfer mode because dropout-free, high-quality images may be required. Alternatively, by switching between the normal mode and the file transfer mode according to a preset schedule, high-quality image data can be automatically acquired at the timing that the user of the client desires.

Figure 3:
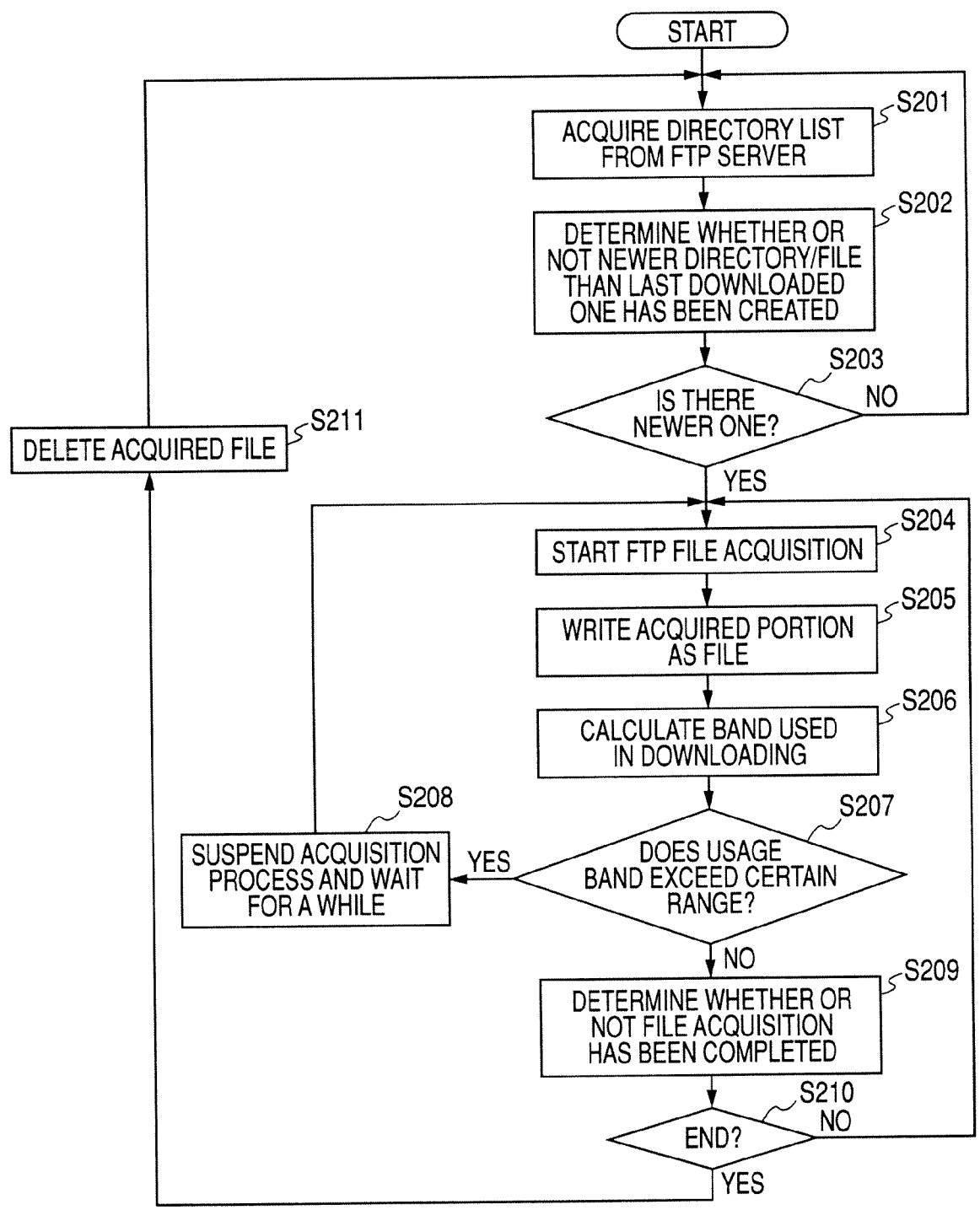
FIG. 3 is a flowchart for explaining the operation in which the size of an acquired file is not dynamically changed.

A description will be made of a specific transfer (reception) method used in the client in the file transfer mode. FIG. 3 is a flowchart for explaining the operation in which the size of an acquired file is not dynamically changed. Firstly, the surveillance camera is set to a mode in which video is recorded to the recording device physically connected to the surveillance camera itself (either internally or externally). Although the streaming process in the surveillance camera may be concurrently continued, it is desirable to stop the streaming process for the sake of the least possible load on the network.

Then, the surveillance camera starts recording video and audio to the recording device physically connected to the surveillance camera itself. The recorded file is written to a predetermined directory in the FTP server as appropriate.

The FTP client function of the software automatically starts. After waiting a predetermined recording time, the FTP file acquisition process starts. In this process, a directory list is acquired from the FTP server (step S201), and it is determined whether or not a newer directory/file than the last downloaded one has been created (step S202). If YES (step S203), FTP file acquisition starts (step S204).

In this file acquisition process, the file is downloaded in such a way that the upper limit of the available bandwidth is not reached. That is, the acquired portion is written as a file (step S205), and the band used in the downloading is calculated (step S206). Then, it is determined whether or not the used band obtained by the calculation exceeds a predetermined range (upper limit) (step S207).

The upper limit may be arbitrarily specified by the user, or may be dynamically determined, for example, by adding a constant value, such as 30% of the average usage band measured by the system, to that average usage band.

When the usage band likely exceeds the upper limit, the client suspends the acquisition process (step S208). Then, when the band becomes available again, the client resumes the file acquisition process. Thus, the files for which the acquisition operation is suspended on the client side needs to be locked on the surveillance camera side.

Then, the client determines whether or not the file acquisition has been completed (step S209). If YES (step S210) the successfully acquired file is deleted from the recording device of the surveillance camera (step S211). This prevents the capacity of the recording device of the camera being exhausted.

Figure 4:
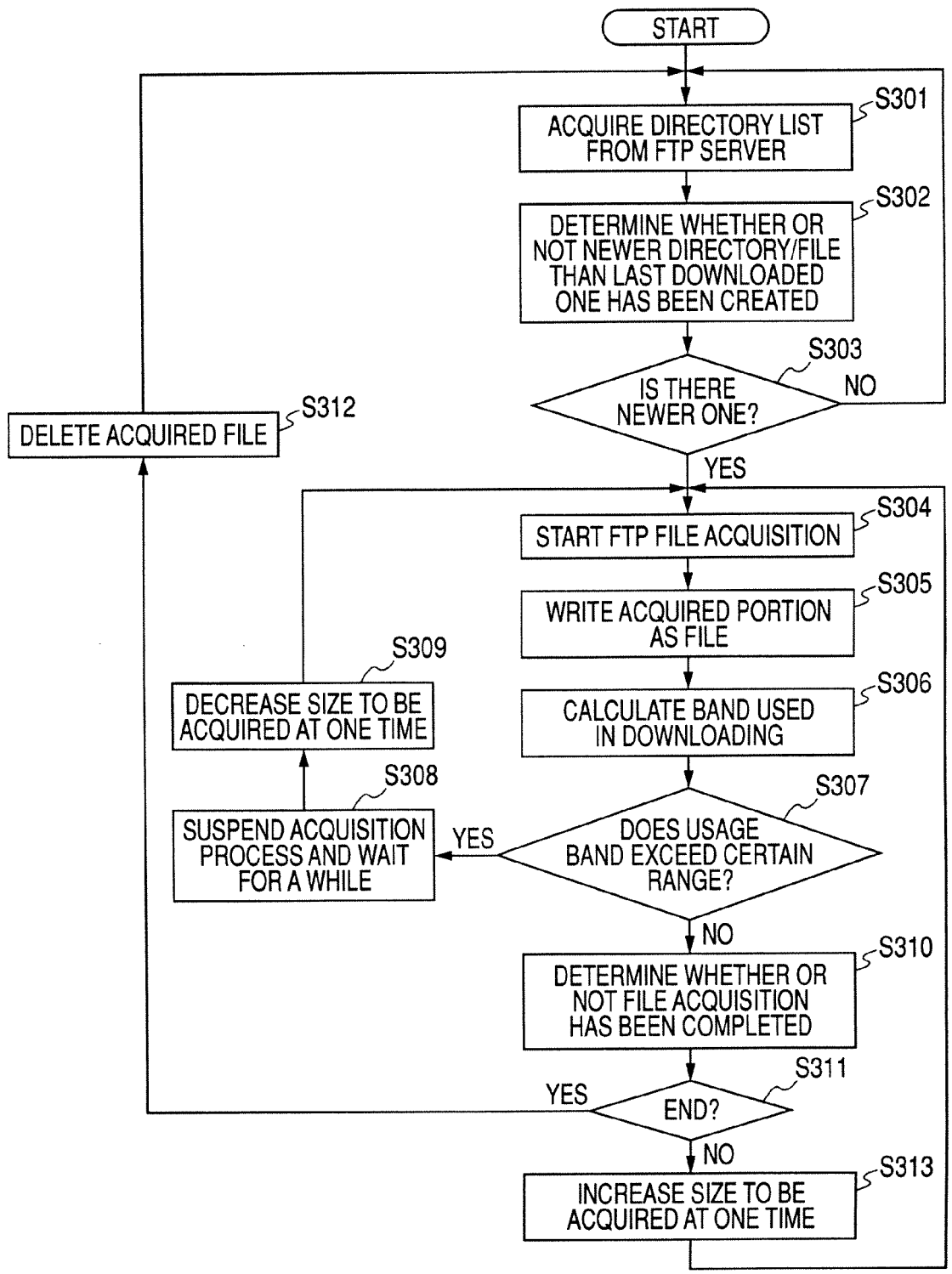
FIG. 4 is a flowchart for explaining the operation in which the size of an acquired file is dynamically changed.

FIG. 4 is a flowchart for explaining the operation in which the size of an acquired file is dynamically changed. Firstly, the surveillance camera is set to a mode in which video are recorded to the recording device physically connected to the surveillance camera itself (either internally or externally). Although the streaming process in the surveillance camera may be concurrently continued, it is desirable to stop the streaming process for the sake of the least possible load on the network.

Then, the surveillance camera starts recording video and audio to the recording device physically connected to the surveillance camera itself. The recorded file is written to a predetermined directory in the FTP server as appropriate.

The FTP client function of the software automatically starts. After waiting a predetermined recording period, the FTP file acquisition process starts. In this process, a directory list is acquired from the FTP server (step S301), and it is determined whether or not a newer directory/file than the last downloaded one has been created (step S302). If YES (step S303), FTP file acquisition starts (step S304).

In this file acquisition process, the file is downloaded by changing the usage band as appropriate. That is, the acquired portion is written as a file (step S305), and the band used in the downloading is calculated (step S306). Then, it is determined whether or not the used band obtained by the calculation exceeds a predetermined range (upper limit) (step S307).

The upper limit may be arbitrarily specified by the user, or may be dynamically determined, for example, by adding a constant value, such as 30% of the average usage band measured by the system, to that average usage band.

When the usage band likely exceeds the upper limit, the client suspends the acquisition process (step S308) and the size to be acquired at one time is decreased (step S309). Then, the client resumes the file acquisition process using this size. The files for which the acquisition process is suspended on the client side needs to be locked on the surveillance camera side.

On the other hand, when the usage band does not exceed the upper limit, the client determines whether or not the file acquisition has been completed (step S310). If YES (step S311) the successfully acquired file is deleted from the recording device of the surveillance camera (step S312). This prevents the capacity of the recording device of the camera being exhausted.

If the file acquisition has not been completed, the size to be acquired at one time is increased (step S313) and the program proceeds to the next file acquisition. By thus dynamically and maneuverably changing the file acquisition size, a file can be efficiently downloaded according to the network condition.

Other examples will be described below.

<1> Cooperating with a Recording Schedule

When the client has a function that controls a recording schedule of the camera, the schedule controls the start/stop of the recording by the camera and the start/stop of the acquisition from the FTP server. This allows a schedule to be designed such that, for example, recording may be always performed, while acquisition may be performed during the night when the band is available.

<2> Cooperation with an Alarm

When the client detects that the camera has generated an alarm (for example, when a moving object is detected, or when the user arbitrarily generates a trigger), the band is preferentially used to perform acquisition from the FTP server. Therefore, even when a serious situation occurs, the contents thereof can be immediately checked.

<3> Acquisition of High-Quality, Pre-Alarm Video/Audio

Figure 5A:
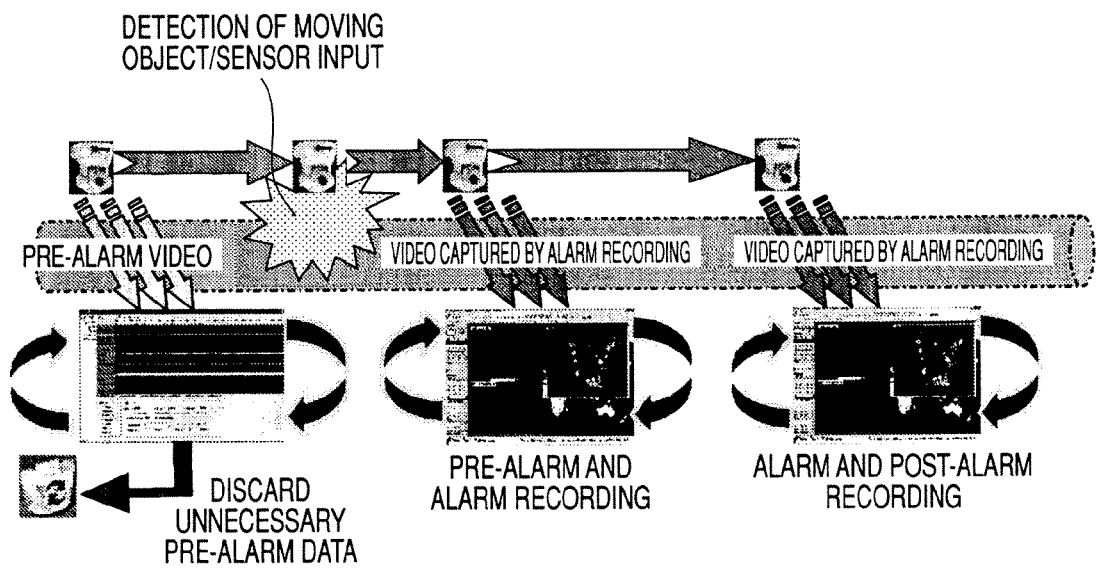
FIGS. 5A and 5B are diagrammatic views for explaining acquisition of pre-alarm video/audio.
Figure 5B:
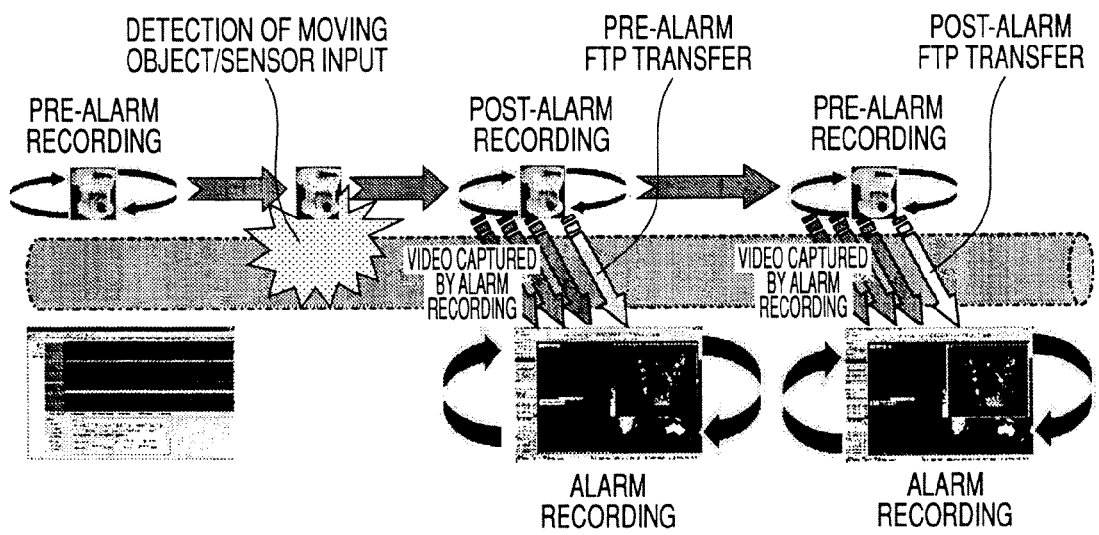

Pre-alarm video/audio is video/audio acquired before an alarm is generated. In related art, for example, if video/audio recording is automatically initiated when an alarm is generated, it may be necessary to always stream and acquire video/audio and accumulate it on the client side even when no alarm is generated (see FIG. 5A). Since this is performed in a way similar to typical streaming, the network load may potentially affect and degrade the streamed video/audio. On the other hand, in this embodiment, since the recording is performed from the surveillance camera directly to the recording device without involving any network, it is possible to record high-quality video/audio without any degradation except that due to the performance of the surveillance camera (see FIG. 5B).

<4> Application to Information Other than Video

This embodiment allows information acquired by the surveillance camera to be recorded as a "file" and can be applied to information whose quality is important when delivered via a network. Examples other than video include audio.

It should be understood by those skilled in the art that various modifications, combinations, sub-combinations and alterations may occur depending on design requirements and other factors insofar as they are within the scope of the appended claims or the equivalents thereof.

What is claimed is:

1. A network camera system that transmits video captured by a camera to a client device via a network, the network camera system comprising:
   a recording device directly connected to the camera or built into the camera; and
   the client device configured to switch between a normal mode in which the camera transmits continuous video images, and a file transfer mode in which video captured by the camera is temporarily stored as a file in the recording device and the file is transferred to the client device in response to an instruction from the client device, wherein
   the client device measures usage during the transmitting of the continuous video images in the normal mode over the network, and switches from the normal mode to the file transfer mode when the measured usage exceeds a preset usage value.

2. The network camera system according to claim 1, wherein the client device is configured to switch from the normal mode to the file transfer mode when a moving object is detected from the video captured by the camera.

3. The network camera system according to claim 1, wherein the client device is configured to switch from the normal mode to the file transfer mode when a predetermined object is detected from the video captured by the camera.

4. The network camera system according to claim 1, wherein the client device is configured to switch between the normal mode and the file transfer mode according to a preset schedule.

5. The network camera system according to claim 1, wherein the camera stores video for a last certain period of time during the normal mode as the file in the recording device and transfers the file to the client device in response to an instruction from the client device.

6. The network camera system according to claim 1, wherein the client device is configured to perform file transfer in the file transfer mode using a size within the preset usage band of the network.

7. The network camera system according to claim 1, wherein the client device is configured to perform file transfer in the file transfer mode by maneuverably changing a size within the preset usage band of the network.

8. A non-transitory computer readable medium storing a network camera control program including instructions, which when executed by a client computer, causes the client computer to receive video captured by a camera via a network by performing a method comprising:
   capturing continuous video images in the camera; and
   switching between a normal mode in which continuous video images captured by the camera are continuously received via the network, and a file transfer mode in which the continuous video images captured by the camera are temporarily stored as files in a recording device directly connected to the camera or built into the camera, and the files being received via the network, wherein
   the switching includes measuring, in the client computer, usage during the receiving of continuous video in the normal mode over the network, and switching from the normal mode to the file transfer mode when the measured usage exceeds a preset usage value.

9. The computer readable medium according to claim 8, wherein the method further includes switching from the normal mode to the file transfer mode when a moving object is detected from the video captured by the camera.

10. The computer readable medium according to claim 8, wherein the method further includes switching from the normal mode to the file transfer mode when a predetermined object is detected from the video captured by the camera.

11. The computer readable medium according to claim 8, wherein the method further includes switching between the normal mode and the file transfer mode according to a preset schedule.

12. The computer readable medium according to claim 8, the method further comprising:
   storing video of a last certain period of time during the normal mode as the file in the recording device during the normal mode and then receiving the file.

13. The computer readable medium according to claim 8, wherein the method further includes performing file transfer in the file transfer mode using a size within the preset usage band of the network.

14. The computer readable medium according to claim 8, wherein the method further includes performing file transfer in the file transfer mode by maneuverably changing a size within the preset usage band of the network.

15. The network camera system according to claim 1, wherein the client device is configured to suspend file transfer in the file transfer mode when the preset usage band is exceeded.

16. The computer readable medium according to claim 8, wherein the method further includes suspending file transfer in the file transfer mode when the preset usage band is exceeded.

17. A network camera control method for transmitting video captured by a camera to a client device via a network, the method comprising:
   capturing continuous video images in the camera; and
   switching between a normal mode in which continuous video images captured by the camera are continuously received via the network and a file transfer mode in which the continuous video images captured by the camera are temporarily stored as files in a recording device directly connected to the camera or built in the camera and the files being received via the network, wherein
   the switching includes measuring, in the client computer, usage during the receiving of continuous video in the normal mode over the network, and switching from the normal mode to the file transfer mode when the measured usage exceeds a preset usage value.

* * * * *